United States Patent
Zhang et al.

(10) Patent No.: US 8,644,368 B1
(45) Date of Patent: Feb. 4, 2014

(54) TRANSPARENT IMPLICIT BEAMFORMING IN A COMMUNICATION SYSTEM

(75) Inventors: Hongyuan Zhang, Fremont, CA (US); Rohit U. Nabar, Santa Clara, CA (US); Srinivasa H. Garlapati, San Ramon, CA (US)

(73) Assignee: Marvell International Ltd., Hamilton (BM)

( * ) Notice: Subject to any disclaimer, the term of this patent is extended or adjusted under 35 U.S.C. 154(b) by 573 days.

(21) Appl. No.: 12/888,310

(22) Filed: Sep. 22, 2010

Related U.S. Application Data

(60) Provisional application No. 61/245,232, filed on Sep. 23, 2009.

(51) Int. Cl.
*H04B 7/24* (2006.01)
*H04B 1/38* (2006.01)

(52) U.S. Cl.
USPC .......... 375/221; 375/220; 375/219; 375/295; 375/316; 455/39

(58) Field of Classification Search
USPC .......... 375/19, 220, 222, 221, 227, 228, 260, 375/295, 285, 316, 346, 347, 348, 3, 56; 455/3.01, 39, 500, 73, 101, 562.1, 455/67.11, 69, 513, 522, 91, 95; 370/260, 370/241, 334, 335, 347
See application file for complete search history.

(56) References Cited

U.S. PATENT DOCUMENTS

| | | | |
|---|---|---|---|
| 7,729,439 B2 | 6/2010 | Zhang et al. | |
| 8,340,597 B1 * | 12/2012 | Nabar et al. | 455/101 |
| 2008/0089396 A1 * | 4/2008 | Zhang et al. | 375/220 |
| 2008/0219373 A1 | 9/2008 | Zhang et al. | |
| 2009/0097395 A1 | 4/2009 | Zhang et al. | |
| 2009/0221241 A1 * | 9/2009 | Ghosh | 455/69 |
| 2010/0091673 A1 * | 4/2010 | Sawai et al. | 370/252 |
| 2010/0104038 A1 * | 4/2010 | Stager et al. | 375/267 |
| 2010/0172425 A1 * | 7/2010 | Pare et al. | 375/260 |
| 2011/0019768 A1 * | 1/2011 | Nammi et al. | 375/295 |

OTHER PUBLICATIONS

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

(Continued)

*Primary Examiner* — Sam K Ahn
*Assistant Examiner* — Linda Wong

(57) ABSTRACT

A method for beamforming in a multiple input, multiple output (MIMO) communication system includes receiving a non-sounding data unit, where the non-sounding data unit does not include an indication that the data unit is for estimating a MIMO communication channel, developing an estimate of a reverse channel in which the non-sounding data unit travels based on the non-sounding data unit, developing an estimate of a forward channel based on the estimate of the reverse channel, and developing a steering matrix to perform beamforming in the forward channel based on the estimate of the forward channel.

18 Claims, 6 Drawing Sheets

(56) References Cited

OTHER PUBLICATIONS

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

"IEEE P802.11n™/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

Love et al., "An Overview of Limited Feedback in Wireless Communication Systems," IEEE J. on Selected Areas in Communications, vo. 26, No. 8, Oct. 2008.

Zhang et al., "Applying Antenna Selection in WLANs for Achieving Broadband Multimedia Communications," IEEE Trans. on Broadcasting, vol. 52, No. 4, Dec. 2006.

\* cited by examiner

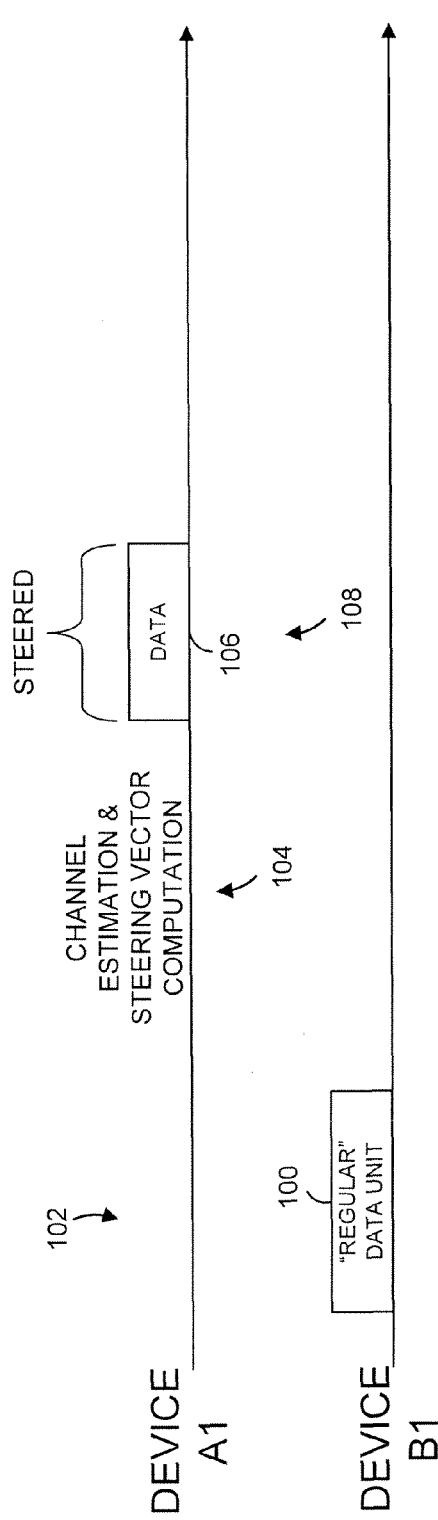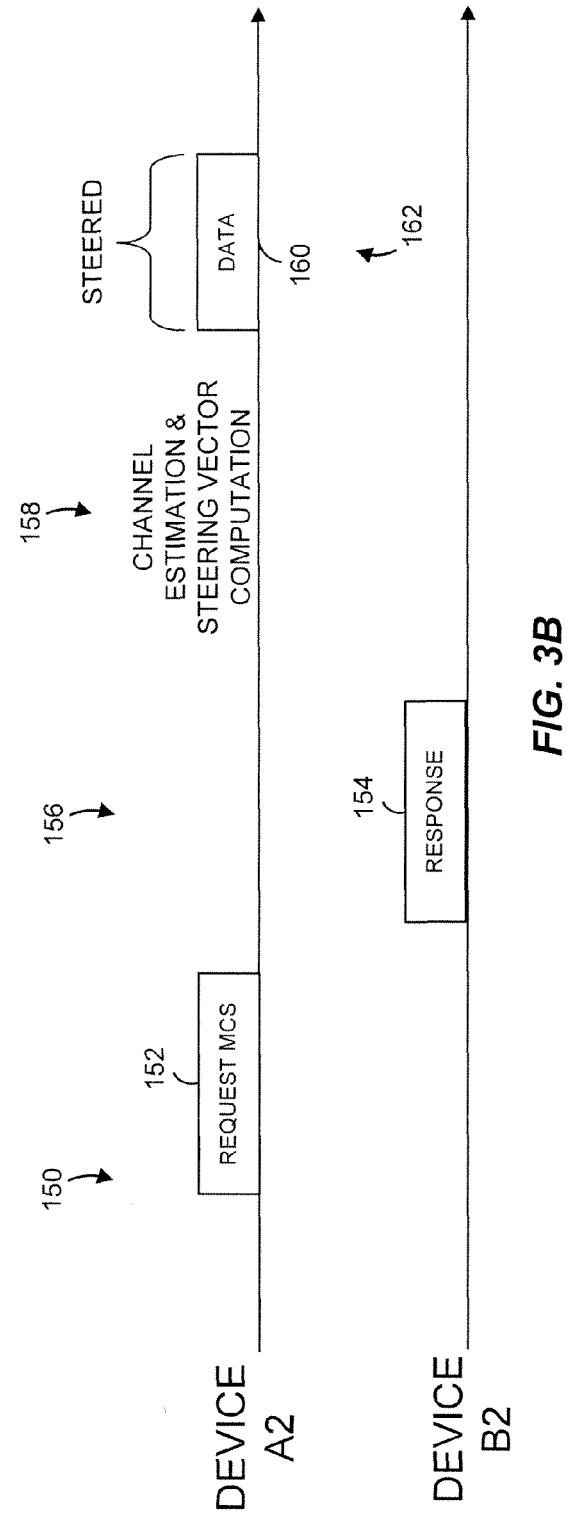

US 8,644,368 B1

TRANSPARENT IMPLICIT BEAMFORMING IN A COMMUNICATION SYSTEM

CROSS REFERENCE TO RELATED APPLICATION

This application claims the benefit of U.S. Provisional Patent Application No. 61/245,232, entitled "Receiver Transparent Implicit Beamforming for MIMO," filed Sep. 23, 2009, the disclosure of which is hereby expressly incorporated herein by reference.

FIELD OF TECHNOLOGY

The present disclosure relates generally to communication systems and, more particularly, to beamforming techniques used in such communication systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some wireless communication systems, one or more communication devices employ multiple antennas. Accordingly, a communication channel between two such devices can be a multiple-input, multiple-output (MIMO) channel when both communication devices employ multiple antennas, a single-input, multiple-output (SIMO) channel when a transmitting device ("the transmitter") employs a single transmit antenna and the receiving device ("the receiver") employs multiple receive antennas, or a multiple-input, single-output (MISO) channel the transmitter employs multiple transmit antennas and the receiver employs a single receive antenna. Referring for simplicity to MIMO communication systems, transmission and reception properties in these systems can be improved by using each of the various transmit antenna to transmit the same signal while phasing (and amplifying) this signal as it is provided to the various transmit antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

Generally speaking, beamforming requires an exchange of beamforming training data between communication devices. Some communication devices, however, do not support beamforming training protocols and therefore cannot explicitly participate in beamforming training Some beamforming techniques are described in the IEEE 802.11n Draft Standard (2009), incorporated herein fully by reference.

SUMMARY

In an embodiment, a method for beamforming in a multiple input, multiple output (MIMO) communication system includes receiving a non-sounding data unit, where the non-sounding data unit does not include an indication that the data unit is for estimating a MIMO communication channel, developing an estimate of a reverse channel in which the non-sounding data unit travels based on the non-sounding data unit, developing an estimate of a forward channel based on the estimate of the reverse channel, and developing a steering matrix to perform beamforming in the forward channel based on the estimate of the forward channel.

In another embodiment, an apparatus for use in a communication system includes a channel estimation unit configured to (i) develop an estimate of a reverse channel based on a non-sounding data unit transmitted via the reverse channel and received via a plurality of antennas, and (ii) develop a forward channel based on the estimate of the reverse channel, where the non-sounding data unit does not include an indication that the data unit is for estimating a MIMO communication channel; and a steering vector computation unit to generate a steering vector for use in the forward channel based on the estimate of the forward channel, where the steering vector is used to perform beamforming in the forward channel.

In another embodiment, a wireless communication system includes a first device having a plurality of antennas and a second device, where the first device determines a steering vector, for use in transmitting data from the first device to the second device via a wireless communication channel, transparently with respect to the second device.

BRIEF DESCRIPTION OF THE DRAWINGS

FIG. 3A is a timing diagram that illustrates a transparent implicit beamforming technique in accordance with an embodiment of the present disclosure;

FIG. 3B is a timing diagram that illustrates a transparent implicit beamforming technique in accordance with another embodiment of the present disclosure;

DETAILED DESCRIPTION

Figure 1:
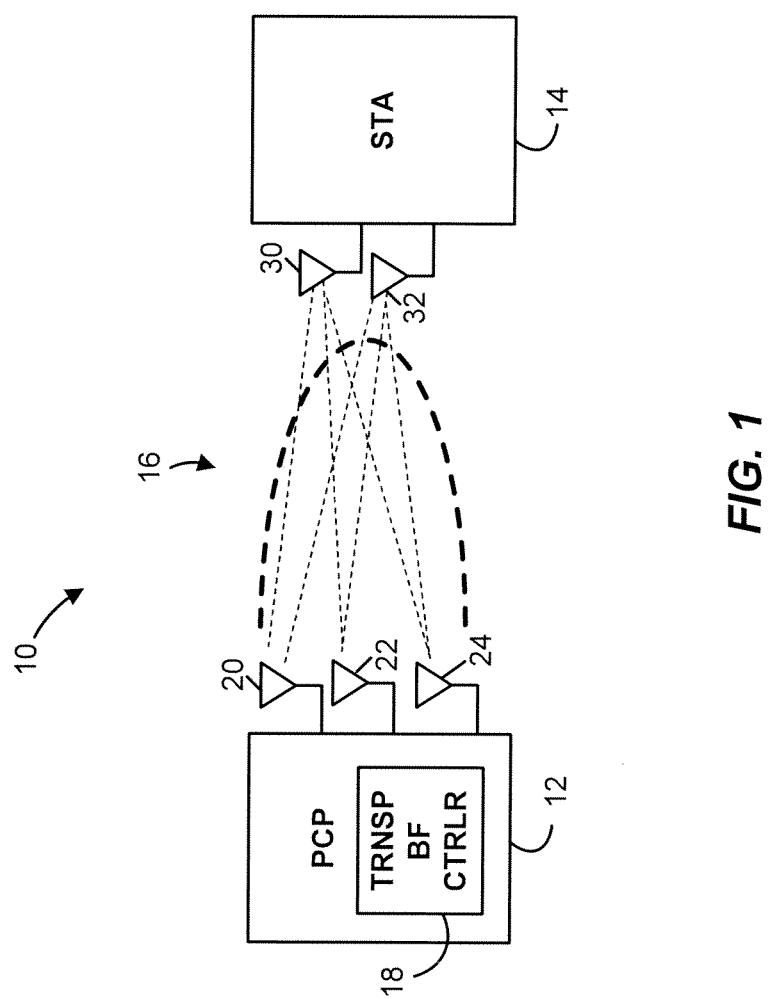
FIG. 1 is a block diagram of a communication system including a receiver and a transmitter that uses transparent implicit beamforming techniques in accordance with an embodiment of the present disclosure.

FIG. 1 illustrates an example embodiment of a wireless communication system 10 in which a transmitter 12 conducts a beamforming procedure to determine a steering vector for use in transmitting data over a MIMO wireless communication channel 16 in the direction of a receiver 14 in accordance with the techniques of the present disclosure. In an embodiment, the beamforming procedure is transparent to the receiver 14. In other words, the receiver 14 need not support certain procedures related to beamforming, such as a procedure to "sound" the communication channel 16. In one configuration of the system 10, for example, the receiver 14 is a low-complexity device that is not configured to process a request to transmit a sounding packet. To conduct beamforming without an explicit support from the receiver 14, in an embodiment, the transmitter 12 equipped with a transparent implicit beamforming controller 18 receives a non-sounding data unit from the receiver 14, develops an estimate of the MIMO communication channel from the receiver 14 to the transmitter 12 (i.e., the "reverse" channel of the transmitter 12), estimates the MIMO communication channel from the transmitter 12 to the receiver 14 (the "forward" channel of the transmitter 12) based on the estimate of the reverse channel, and develops a steering matrix for use in the transmit direction based on the estimate of the forward channel. This approach, along with other embodiments of transparent implicit beamforming, are discussed in detail below.

In an embodiment, the transmitter 12 is a Piconet Central Point (PCP) equipped with a transparent implicit beamforming controller 18, and the receiver 14 is a station. The forward channel of the transmitter 12 accordingly corresponds to the downlink direction, and the reverse channel of the transmitter 12 corresponds to the uplink direction.

The transmitter 12 and the receiver 14 are equipped with respective sets of more antennas 20-24 and 30-32. In general, devices in the wireless communication system 10 operate in multiple modes (e.g., a transmit mode and a receive mode). Accordingly, in some embodiments, antennas 20-24 and 30-34 support both transmission and reception. However, in other embodiments, a given device includes separate transmit antennas and separate receive antennas. Further, the wireless communication system 10 in general can include any number of devices, each equipped with the same or a different number of antennas (e.g., 1, 2, 3, 4 antennas and so on). For downlink beamforming, however, at least the transmitter 12 generally should include more than one antenna.

To conduct explicit beamforming in the forward (transmit) direction, a communication device typically transmits one or several training data units to another device to directly estimate the forward channel. On the other hand, in at least some embodiment, a communication device conducts implicit beamforming by estimating the forward channel using an estimate of the reverse channel by exploiting channel reciprocity (which may be achieved through calibration, for example).

Figure 2:
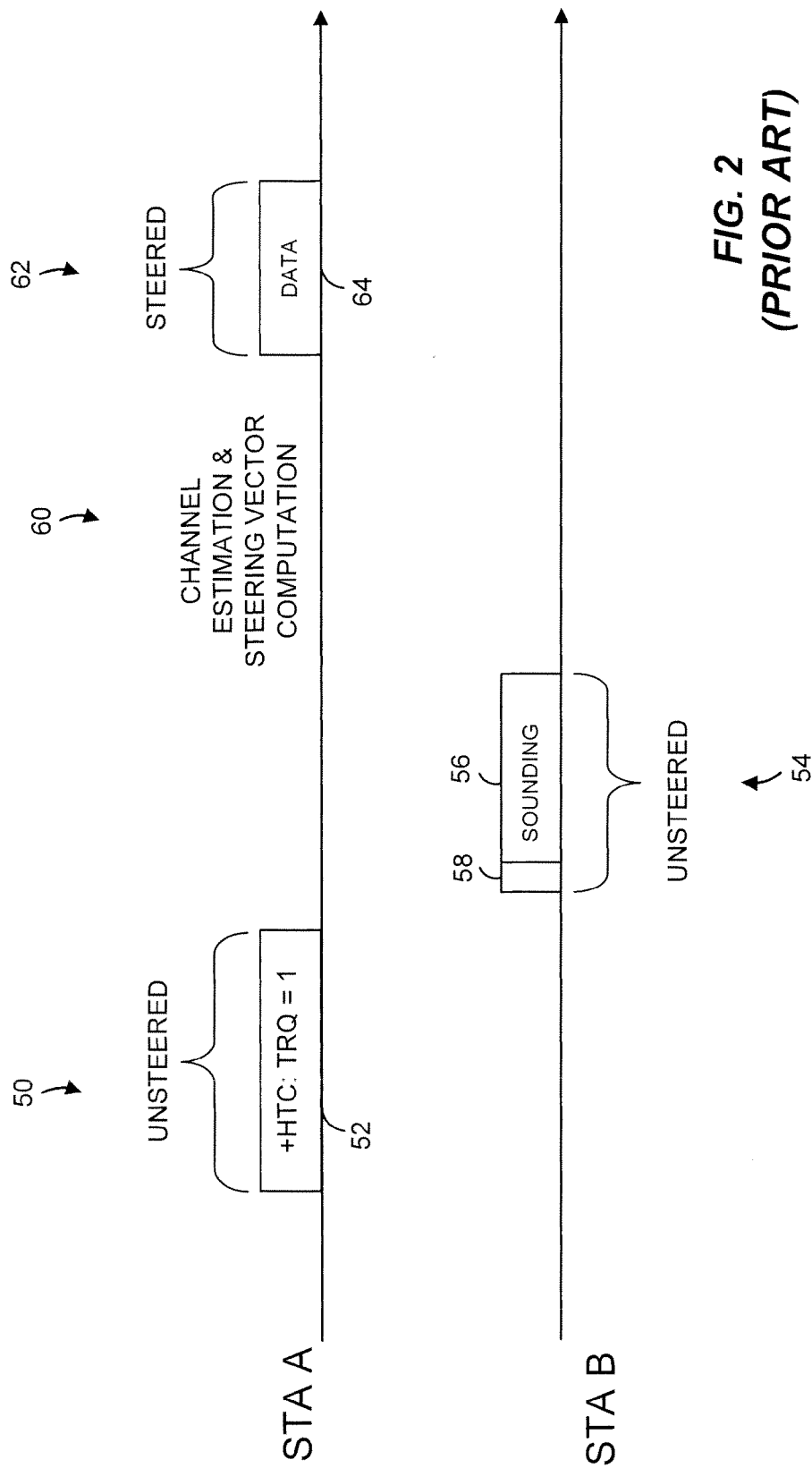
FIG. 2 is a timing diagram that illustrates a prior art implicit beamforming technique.

For clarity, FIG. 2 illustrates a known implicit beamforming technique conducted by two devices supporting implicit beamforming, such as Station A and Station B, over a MIMO communication channel. Station A in FIG. 2 is a beamformer (i.e., a device that transmits a data unit using a steering matrix) and Station B is a beamformee (i.e., a device that receives a data unit transmitted using a steering matrix). During a time interval 50, Station A transmits a high throughput control (HTC) frame 52 that specifies a request to transmit a sounding frame (TRQ).

In response to receiving the frame 52, the implicit-beamforming-capable Station B transmits a sounding packet 56 having several training fields in a portion 58 so as to enable Station A to accurately estimate the MIMO channel. In particular, as each training field is transmitted, Station B applies a different mapping of symbols to spatial streams, and the number of training fields usually corresponds to the number of spatial streams used for modulating data packets transmitted from Station B to Station A. The sounding packet 56 generally does not serve any purpose other than sounding the communication channel, and accordingly does not carry any information unrelated to channel sounding. Further, the sounding packet 56 is not transmitted between Stations A and B during procedures other than the sounding procedure.

During a time interval 60, Station A estimates the MIMO channel in the direction from Station B to Station A (i.e., the reverse channel) based on the training fields of the sounding packet. Station A then generates an estimate of the forward channel using the estimate of the reverse channel and generates a steering vector for use in downlink transmissions. As illustrated in FIG. 2, during a time period 62, Station A transmits a data packet 64 using the steering vector generated in the interval 60.

Referring to FIG. 3A, in an embodiment, Device A1 is a PCP capable of conducting transparent implicit beamforming to steer data in the direction of a low-complexity station, such as Device B1, that does not support a beamforming procedure (e.g., HTC TRQ frame). Device A1 is a beamformer, and Device B1 is a beamformee in the example scenario illustrated in FIG. 3A. Device A1 receives a "regular" data unit 100 during a time interval 102 over a MIMO communication channel between Device B1 and Device A1. As used herein, a regular data unit is a non-sounding data unit used in any procedure other than channel sounding, e.g., data exchange, modulation and coding scheme (MCS) feedback, etc., and the data unit 100 is a communication frame, a data packet, etc. For example, in a communication system that implements the IEEE 802.11n standard, the data unit 100 is not a sounding physical layer convergence procedure (PLCP) protocol data unit (PPDU) or a null data packet (NDP) used specifically for sounding. In some embodiments, the data unit 100 does not include an indication that the data unit 100 is for sounding a communication channel (while data units used for sounding communication channels include such an indication). Further, in some embodiments, the data unit 100 includes an explicit indication that the data unit 100 is not for sounding the communication channel. Still further, in some embodiments, the data unit 100 is not transmitted in response to a request to transmit a sounding packet. Device B1 transmits the data unit 100 for a purpose unrelated to sounding the MIMO channel. For example, in an embodiment, the data unit 100 is a data packet that includes a data payload. The implicit beamforming procedure is therefore transparent to Device B1.

In some embodiments, Device B1 transmits the data unit 100 using multiple spatial streams, and the data unit 100 accordingly includes information (e.g., training fields in the physical layer (PHY) preamble) that can be used to estimate the reverse MIMO channel at Station A1. For example, the data unit 100 can include a payload transmitted over three spatial streams and, accordingly, three training fields in the PHY preamble to enable a receiver of the data unit 100 to properly process the payload. During a time interval 104, Device A1 estimates the reverse channel, estimates the forward channel using the estimate of the reverse channel, and calculates a transmit (Tx) steering vector to be used in transmitting a data unit 106 to Station B1 during a time interval 108.

For example, in an embodiment, Device A1 obtains channel state information (CSI) that describes one or more characteristics of each spatial stream associated with the reverse channel (e.g., the gain, the phase, the SNR). The CSI can be represented, for example, in a matrix format as a two-dimensional channel matrix H that specifies, in each element, a channel gain parameter for a spatial stream defined by the corresponding transmit antenna and a receive antenna. To generate an estimate of the forward channel, in an embodiment, Device A1 calculates the transpose of the matrix that describes the reverse channel. In doing so, Device A1 assumes that the MIMO channel between Devices A1 and B1 is symmetrical so that the forward channel and the reverse channel can be considered to be reciprocal.

In an embodiment, Device A1 does not assume complete reciprocity and generates a calibration matrix to compensate for measured (or estimated) differences between the forward channel and the reverse channel. In other words, Device A1 generates the calibration matrix to restore reciprocity of the MIMO communication channel. In general, a communication device develops a calibration matrix by conducting channel estimation of the forward channel, receiving channel estimation information corresponding to the forward channel from a peer device (via a feedback message, for example), and using the two estimates to generate a matrix that would restore reciprocity to the MIMO channel. However, in an embodiment, Device B1 does not support channel estimation feedback, and Device A1 generates the calibration matrix by conducting a self-calibration procedure. For example, Device A1 develops a matrix or a scalar multiplier that reduces the phase and/or amplitude mismatches across transmit chains and receive chains, according to an embodiment.

With continued reference to FIG. 3A, the regular data unit 100 in some cases includes fewer training fields than spatial dimensions associated with the MIMO channel. In an embodiment, Station A1 develops a partial estimate of the MIMO channel, and uses the partial estimate to develop a steering matrix to achieve a partial transmit gain. However, Devices A1 and B1 generally achieves better SNR when Device A1 uses full-dimensional channel estimation during implicit beamforming.

Depending on the embodiment, Devices A1 and B1 communicate in a single-carrier (SC) mode or in an Orthogonal Frequency Division Multiplexing (OFDM) mode using multiple sub-carriers. According to one embodiment, when conducting transparent implicit beamforming in an OFDM mode, Device A1 estimates the reverse channel for each sub-carrier (or "tone"). According to another embodiment, Device A1 computes a single steering matrix across all tones. One such technique is described in U.S. patent application Ser. No. 12/251,834, the entire disclosure of which is hereby incorporated by reference herein.

Depending on the embodiment, Device A1 computes the beamforming steering matrix based on the description of the estimated forward channel using singular value decomposition (SVD), codebook selection in each tone as described in for example, U.S. patent application Ser. No. 12/044,117 (the entire disclosure of which is hereby incorporated by reference herein), cophasing (if Device A1 has a single receive antenna), or another suitable technique. When the number of spatial streams is less than the number of transmit antennas used to transmit the data unit 100, Device A1 in one embodiment performs ad-hoc codebook selection by applying steering matrices selected from a limited codebook, computing a metric such as capacity or receiver strength, for example, and selecting the steering vector associated with the best metric.

Referring to FIG. 3B, Device A2 is a beamformer that conducts implicit beamforming transparently to Device B2 (the beamformee) in accordance with another embodiment of the present disclosure. During a time interval 150, Device A2 transmits a data unit 152 to Device B2 so as to cause the Device B2 to transmit a data unit 154 during a time interval 156. The data unit 154 is not a sounding packet. In at least some of the embodiments, the data unit 154 serves a purpose wholly unrelated to sounding the communication channel. During a time period 158, Device A2 estimates the reverse channel, estimates the forward channel using the estimate of the reverse channel, and calculates a transmit (Tx) steering vector to be used in transmitting a data unit 160 to Station B2 during a time interval 162. In this manner, Device A2 conducts an implicit beamforming procedure transparent to Device B2.

In an embodiment, the data unit 154 is directly responsive to the data unit 152. For example, the data unit 152 is a communication frame that specifies an MCS request (MRQ), and the data unit 154 is a communication frame that includes an MCS feedback (MFB). However, the data unit 154 need not be transmitted directly in response to the data unit 152. For example, the data unit 154 can be a communication frame transmitted after the data unit 152 is received, where the information in the data unit 152 affects the manner in which the data unit 154 is transmitted.

For example, according to some embodiments, the data unit 152 includes a recommendation for Device B2 regarding the MCS to be used by Device B2 for when transmitting one or more data units to Device A2. Further, the data unit 152 in one such embodiment recommends that a non-sounding data unit transmitted to Device A2 be modulated or coded at a low rate (e.g., the lowest rate available) to ensure that the non-sounding data unit can be used for sounding the reverse channel.

In an embodiment, the data unit 152 is a communication frame that includes an unsolicited MFB. The data unit 152 in this case requests the beamformee (Device B2) to transmit a data unit with a number of spatial streams equal to the number of transmit antennas available at the beamformee to conduct a full-dimensional channel estimation. The beamforming Device A2 determines the number of transmit antennas used by the beamformee using the MCS capability information supplied by Device B2.

In yet other embodiments, the data units 152 and 154 correspond to another scheme supported by Devices A2 and B2. In one such embodiment, Devices A2 and B2 are provided by the same manufacturer and support a proprietary method for exchanging communication frames.

Figure 4:
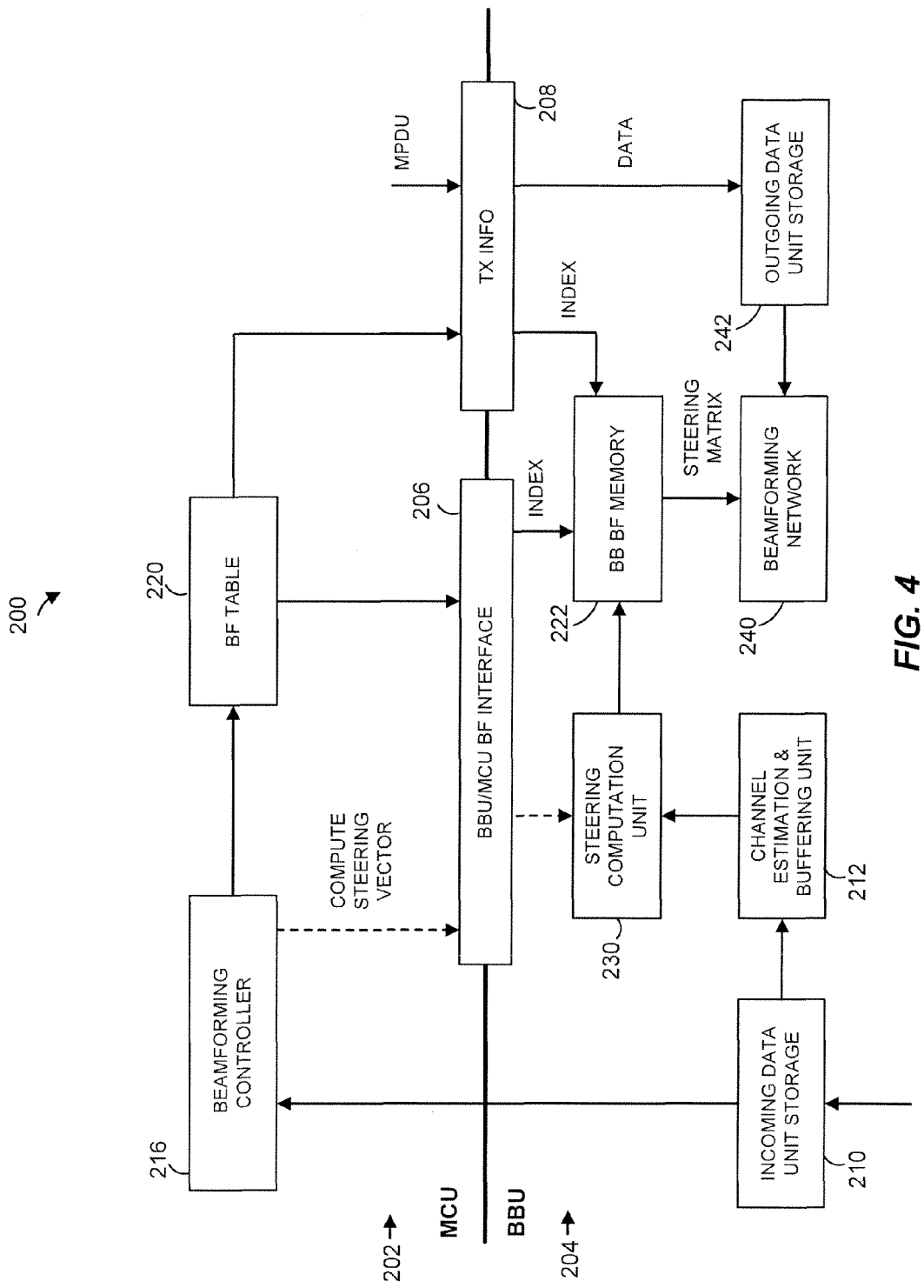
FIG. 4 is a block diagram of an example transmitter in which a transparent implicit beamforming technique is implemented in one or several hardware components, according to an embodiment of the present disclosure.
Figure 5:
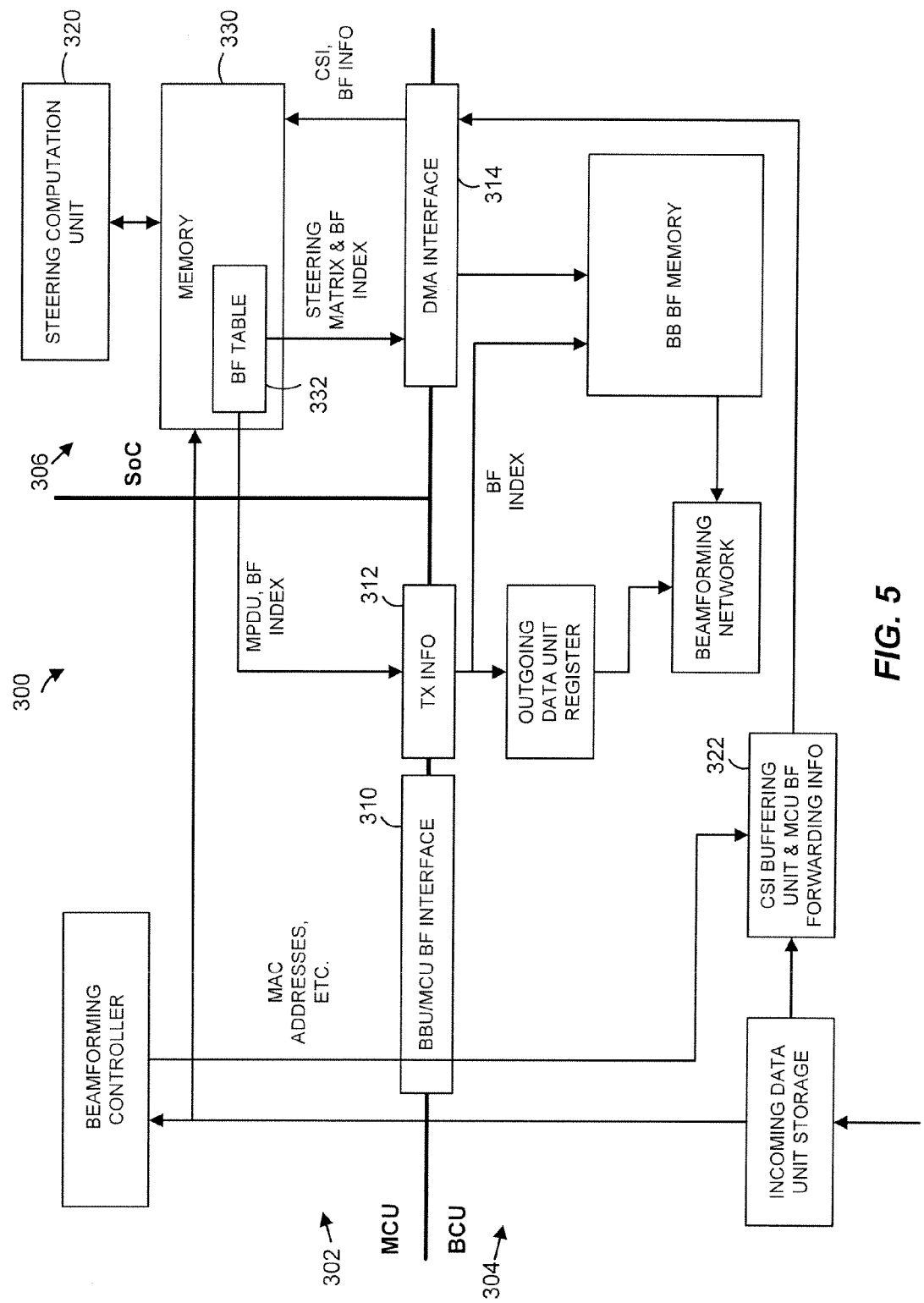
FIG. 5 is a block diagram of an example transmitter in which a transparent implicit beamforming technique is implemented in one or several software components, according to an embodiment of the present disclosure.

Referring back to FIG. 1, the technique of FIG. 3A or FIG. 3B is implemented in the system 10, in an embodiment. Further, depending on the embodiment, the transparent beamforming controller 18 includes hardware components, software components, or a combination thereof. Next, FIG. 4 illustrates an example beamformer, capable of transparent implicit beamforming, in which implicit beamforming is implemented using primarily hardware components. On the other hand, FIG. 5 illustrates another example beamformer, capable of transparent implicit beamforming, in which implicit beamforming is implemented using primarily software components. Depending on the embodiments, some of the components illustrated in FIG. 4 or FIG. 5 are associated with the transparent beamforming controller 18.

First referring to FIG. 4, a beamformer 200 includes a MAC layer control unit (MCU) 202 and a baseband unit (BBU) 204 interconnected, at least in part, by a BBU/MCU interface 206 and by a transmit (Tx) information interface 208, according to an embodiment. The BBU 204 includes an incoming data unit storage 210 to store a received non-sounding data unit (such as the data unit 100 or 154 discussed above, for example). Depending on the embodiment, the incoming data unit storage 210 is a dedicated hardware register, a portion of the BCU memory, etc. A channel estimation unit 212 calculates and buffers CSI information corresponding to the data unit located in the storage 210, according to an embodiment. For example, the channel estimation unit 212 can calculate the CSI for each spatial stream using the corresponding training field, and buffer each CSI value until a multi-dimensional channel estimate of the MIMO channel can be generated. In an embodiment, the channel estimation unit 212 also estimates the forward channel based on the estimate of the reverse channel by calculating the transpose of the reverse channel estimation matrix, for example.

In an embodiment, the MCU 202 instructs the BBU 204 to always buffer channel estimation information for all received data units irrespective of the type of the data unit. For example, regardless of whether the high throughput signaling (HT-SIG) field in the PHY preamble of a packet transmitted in an 802.11n system indicates that the packet is a sounding packet or a non-sounding packet, the BBU 204 determines and buffers CSI information for the packet. However, in another embodiments, the MCU 202 instructs the BBU 204 to selectively buffer channel estimation information.

As illustrated in FIG. 4, in an embodiment, the received non-sounding data unit is also supplied to a beamforming controller 216 within the MCU 202 that determines a MAC address of the beamformee from which the non-sounding data unit has been received, and supplies the MAC address to a beamforming table 220 that stores a mapping of a MAC address to a corresponding index in a baseband beamforming memory unit 222 within the BBU 204. To cause the BBU 204 to compute a steering vector, the beamforming controller 216 issues a compute steering vector command to a steering computation unit 230 within the BBU 204 via the a BBU/MCU interface 206, according to an embodiment. The steering computation unit 230 in an embodiment computes the steering vector using the CSI information buffered by the buffering CSI unit 212. As discussed above, the steering computation unit 230 implements any suitable technique such as SVD, codebook selection, etc. In the embodiment illustrated in FIG. 4, the steering computation unit 230 causes the computed steering vector to be stored in the baseband beamforming memory unit 222. In another embodiment, rather than being delivered to the baseband beamforming memory unit 222 directly (as illustrated in FIG. 4), the steering vectors are delivered to the MCU 202 via the BBU/MCU interface 206, combined with the corresponding indexes, and transferred to the beamforming memory unit 222 via the BBU/MCU interface 206.

In some embodiments, the beamforming controller 216 determines whether a beamformee supports an explicit or implicit beamforming protocol based on beamformee capability advertised by the beamformee, for example. If the beamforming controller 220 determines that the beamformee does not support explicit or implicit beamforming, the beamforming controller 216 in some situations initiates a transparent implicit beamforming procedure. As discussed above with reference to FIGS. 3A and 3B, in some embodiments, the beamforming controller 216 causes (directly or indirectly) the beamformee to transmit a non-sounding packet to the beamformer 200 by passing an appropriate data unit to BBU 200 via the Tx information interface 208. In other embodiments, the beamforming controller 216 causes the BBU 200 to buffer CSI information, calculate a steering vector, etc. for data units received from the beamformee without a data unit previously transmitted to the beamformee.

To steer a data unit, such as a MAC protocol data unit (MPDU), to a beamformee, the beamforming controller 216 selects the appropriate beamformee from the beamforming table 220, and passes the appropriate index to the baseband beamforming memory unit 222 to retrieve a steering vector corresponding to the beamformee. A beamforming network 240 then applies the steering vector to a transmit antenna array to steer the MPDU stored in an outgoing data unit storage 242, according to an embodiment.

Referring to FIG. 5, a beamformer 300 includes an MCU 302, a BBU 304, and a software controller (SoC) 306. The MCU 302 and the BBU 304 are interconnected by a BBU/MCU interface 310 and by a Tx information interface 312, and the SoC 306 and the BBU 304 are interconnected by a direct memory access (DMA) interface 314, according to an embodiment. Unlike the beamformer 200, the beamformer 300 computes the steering vector using a steering computation unit 320 disposed in the SoC 306. In an embodiment, a CSI buffering and an MCU beamforming information forwarding unit 322 provides CSI information as well as the MAC address of the beamformee (received from the MCU 302) to a general-purpose memory unit 330 via the DMA interface 314. The steering computation unit 320 accordingly computes the steering vector and, in an embodiments, updates a beamforming table 332 in the memory 330.

Figure 6:
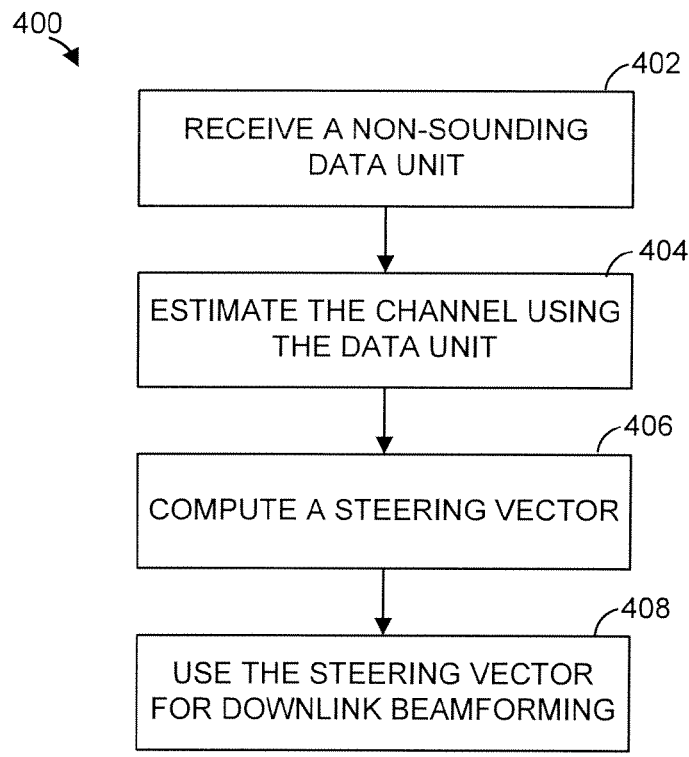
FIG. 6 is a flow diagram of an example method for transparent implicit beamforming, in accordance with an embodiment of the present disclosure.

FIG. 6 is a flow diagram of an example method 400 for transparent implicit beamforming that can be implemented by some of the components of the beamformer 200 or 300, for example. At block 402, a non-sounding data unit is received, preferably with multiple spatial streams. The reverse communication channel over which the data unit was received is estimated at block 404. Referring back to FIG. 4, for example, the channel estimation unit 212 determines implements block 404, according to an embodiment. In at least some of the embodiments, the forward communication channel is estimated at block 404 based on the estimate of the reverse channel.

Next, at block 406, a steering vector is calculated. The steering computation unit 230 of FIG. 4 or the steering computation unit 320 of FIG. 5 can implement block 406, for example. At block 408, the steering vector is applied to an antenna array to steer a data unit such as a communication frame that carries a payload to the beamformee.

Figure 7:
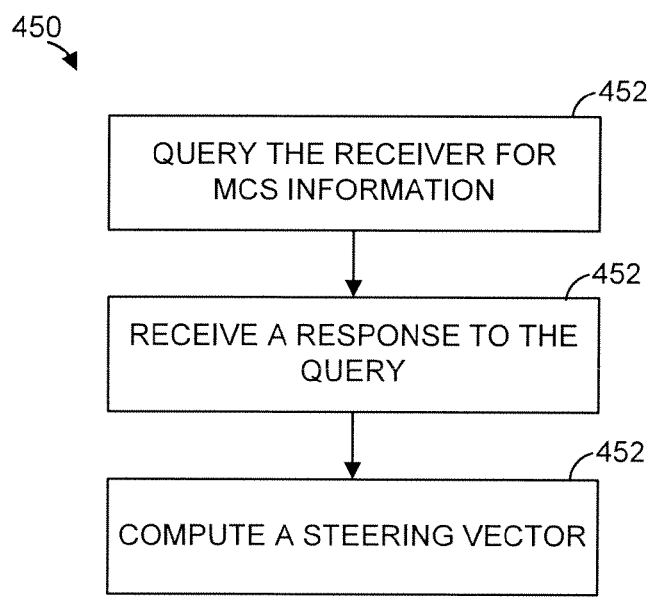
FIG. 7 is a flow diagram of an example method for transparent implicit beamforming in a forward channel, in accordance with an embodiment of the present disclosure.

FIG. 7 is a flow diagram of another example method 450 for transparent implicit beamforming in a forward channel. At block 452, a query for MCS information is transmitted to the beamformee. In another embodiment, the beamformer transmits a different message to the beamformee to cause the beamformee to respond with a data unit having multiple spatial streams. Next, a response is received at block 454, and channel estimation and a steering vector are computed at block 456 as discussed above.

Thus, the method 450 is generally similar to the method 400, except a data unit based on which at least a partial description of the reverse channel can be determined is actively elicited from the beamformee according to the method 450.

From the foregoing, it will be appreciated that a method and a corresponding apparatus for conducting implicit beamforming that is transparent to the beamformee has been disclosed. Beamformee-transparent implicit beamforming includes, in an embodiment, receiving a non-sounding data unit, preferably with training information corresponding to multiple spatial streams, estimating a reverse channel based on the received data unit, estimating the forward channel using the estimate of the reverse channel, and developing a steering vector for use in the forward direction. As used herein, a non-sounding data unit is a data unit that serves a purpose other than sounding a communication channel. For example, a non-sounding packet used in an 802.11n communication system specifies that the packet is not a sounding packet by setting the NOT_SOUNDING flag to logical "true" in the HT-SIG portion of the PHY preamble. In other embodiments, the non-sounding packet includes another type of an indicator that indicates that the non-sounding packet is not associated with a channel sounding procedure.

In general, beamformee-transparent implicit beamforming can be used with any beamformee device in a communication system irrespective of the capability of the beamformee. For example, in a communication system that includes a beamformer capable of transparent implicit beamforming and any beamformee (i.e., a beamformee that supports messaging related to beamforming, a beamformee that does not support messaging related to beamforming, etc.), the entire channel estimation and beamforming procedure for the forward channel is controlled by the beamformer alone. In fact, as discussed above, the beamformee in some embodiments is "unaware" of an ongoing beamforming procedure (i.e., the beamformer does not and/or cannot recognize a beamforming procedure and/or a procedure related to developing a description of a communication channel such as channel sounding, for example). In other words, the beamformer determines a steering vector for use in steering data to the beamformee in such a manner that the beamformee does not explicitly participate in beamforming.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for beamforming in a multiple input, multiple output (MIMO) communication system, the method comprising:
    transmitting, from a first communication device, a data unit that includes an unsolicited modulation and coding scheme (MCS) feedback (MFB), wherein the data unit that includes the unsolicited MFB requests the transmission of a non-sounding data unit with a number of spatial streams equal to a number of transmit antennas available at a second communication device;
    responsive to the transmitted data unit that includes the unsolicited MFB, receiving the non-sounding data unit, wherein the non-sounding data unit does not include an indication that the non-sounding data unit is for estimating a MIMO communication channel;
    developing, based on the non-sounding data unit, an estimate of a reverse channel through which the non-sounding data unit traveled;
    developing, based on the estimate of the reverse channel, an estimate of a forward channel; and
    developing, based on the estimate of the forward channel, a steering matrix to perform beamforming in the forward channel.

2. The method of claim 1, wherein the non-sounding data unit includes an indicator that indicates that the non-sounding data unit is not associated with channel sounding.

3. The method of claim 1, wherein the non-sounding data unit is received from the second communication device and wherein the second communication device is not configured to respond to a request to transmit a sounding packet.

4. The method of claim 1, further comprising causing the non-sounding data unit to be transmitted via a wireless communication channel.

5. The method of claim 4, further comprising causing the non-sounding data unit to be transmitted at a lowest available rate of modulation or coding.

6. The method of claim 1, wherein the non-sounding data unit includes training information corresponding to a plurality of spatial streams.

7. The method of claim 1, further comprising developing a calibration matrix, wherein developing the steering matrix is further based on the calibration matrix.

8. An apparatus for use in a first communication device, the apparatus comprising:
    a transceiver configured to transmit a data unit that includes an unsolicited modulation and coding scheme (MCS) feedback (MFB), wherein the data unit that includes the unsolicited MFB requests the transmission of a non-sounding data unit with a number of spatial streams equal to a number of transmit antennas available at a second communication device, wherein the transceiver includes:
    a channel estimation unit configured to (i) develop an estimate of a reverse channel based on the non-sounding data unit transmitted via the reverse channel and received via a plurality of antennas, and (ii) develop a forward channel based on the estimate of the reverse channel, wherein the non-sounding data unit does not include an indication that the data unit is for estimating a multiple input, multiple output (MIMO) communication channel, and
    a steering vector computation unit to generate, based on the estimate of the forward channel, a steering vector for use in the forward channel,
    wherein the steering vector is used to perform beamforming in the forward channel.

9. The apparatus of claim 8, wherein the non-sounding data unit includes an indicator that indicates that the non-sounding data unit is not associated with channel sounding.

10. The apparatus of claim 8, wherein the non-sounding data unit is received from the second communication device, and wherein the second communication device is not configured to respond to a request to transmit a sounding packet.

11. The apparatus of claim 8, wherein the transceiver further comprises a beamforming controller configured to transmit a request to cause the non-sounding data unit to be transmitted.

12. The apparatus of claim 8, wherein the non-sounding data unit includes training information corresponding to a plurality of spatial streams.

13. The apparatus of claim 8, wherein the channel estimation unit is configured to buffer channel estimation information for every received data unit.

14. A wireless communication system comprising:
a first communication device having a plurality of antennas, the first communication device configured to transmit a data unit that includes an unsolicited modulation and coding scheme (MCS) feedback (MFB), wherein the data unit that includes the unsolicited MFB requests the transmission of a non-sounding data unit with a number of spatial streams equal to a number of transmit antennas available at a second communication device,
wherein the first communication device includes a channel estimation unit configured to (i) develop an estimate of a wireless communication channel in a reverse direction based on the non-sounding data unit received from the second communication device, and (ii) develop an estimate of the wireless communication channel in a forward direction based on the estimate of the wireless communication channel in the reverse direction, and
wherein the first communication device is configured to determine a steering vector, for use in transmitting data from the first communication device to the second communication device via the wireless communication channel, transparently with respect to the second device, using the estimate of the wireless communication channel in the forward direction.

15. The system of claim 14, wherein the second communication device does not support messaging defined specifically for developing a description of the wireless communication channel.

16. The system of claim 14, wherein the first communication device further includes a controller configured to cause the data unit that includes the unsolicited MFB to be transmitted to the second communication device, wherein the non-sounding data unit includes training information corresponding to the number of spatial streams equal to the number of transmit antennas available at the second communication device a plurality of spatial streams.

17. The system of claim 14, wherein the first communication device includes a controller configured to perform self-calibration of the first communication device to develop a calibration matrix, wherein the first communication device applies the calibration matrix to restore reciprocity between (i) a forward direction of the wireless communication channel and (ii) a reverse direction of the wireless communication channel.

18. The system of claim 14, wherein the first communication device is configured to determine the steering vector using the non-sounding data unit that includes an indicator that indicates that the non-sounding data unit is not associated with channel sounding.

* * * * *